United States Patent
Stefanuk

(10) Patent No.: US 7,602,957 B2
(45) Date of Patent: Oct. 13, 2009

(54) IMAGE-BASED CHECK PROCESSING SYSTEM AND A METHOD OF OPERATING AN IMAGE-BASED CHECK PROCESSING SYSTEM TO TEST FOCUS OF AN IMAGING CAMERA

(75) Inventor: Nancy B. M. Stefanuk, Waterloo (CA)

(73) Assignee: NCR Corporation, Dayton, OH (US)

( * ) Notice: Subject to any disclaimer, the term of this patent is extended or adjusted under 35 U.S.C. 154(b) by 977 days.

(21) Appl. No.: 10/732,653

(22) Filed: Dec. 10, 2003

(65) Prior Publication Data
US 2005/0128338 A1   Jun. 16, 2005

(51) Int. Cl.
G06K 9/00 (2006.01)
G03B 13/00 (2006.01)
H04N 5/232 (2006.01)

(52) U.S. Cl. .................. 382/137; 382/112; 348/345
(58) Field of Classification Search ............. 382/137, 382/112; 348/175, 187, 345
See application file for complete search history.

(56) References Cited

U.S. PATENT DOCUMENTS

| | | | |
|---|---|---|---|
| 4,205,349 A | 5/1980 | Kawazu et al. | |
| 4,427,998 A | 1/1984 | Huntoon | |
| 4,724,330 A | 2/1988 | Tuhro | |
| 5,040,228 A | 8/1991 | Bose et al. | |
| 5,048,106 A | 9/1991 | Nakajima et al. | |
| 5,692,065 A | 11/1997 | Prakash et al. | |
| 5,712,921 A | 1/1998 | Zabele | |
| 5,963,654 A | 10/1999 | Prakash et al. | |
| 6,038,052 A | 3/2000 | Arnold et al. | |
| 6,155,604 A * | 12/2000 | Greene et al. | 283/70 |
| 6,282,308 B1 * | 8/2001 | Cossette | 382/137 |
| 6,498,867 B1 * | 12/2002 | Potucek et al. | 382/274 |
| 2003/0072501 A1 * | 4/2003 | Enomoto | 382/311 |
| 2003/0169899 A1 * | 9/2003 | Slepyan et al. | 382/100 |

* cited by examiner

Primary Examiner—John B Strege
(74) Attorney, Agent, or Firm—Michael Chan

(57) ABSTRACT

An image-based check processing system has a focus test pattern on a background surface which is disposed along one side of a document transport path. An imaging camera is disposed along an opposite side of the document transport path and faces the focus test pattern. The imaging camera captures an image of a financial document along the document transport path when the financial document is between the imaging camera and the focus test pattern, and captures an image of the focus test pattern when no financial document is between the imaging camera and the focus test pattern. An energizeable first light source of a first electromagnetic frequency is provided for, when energized, illuminating a financial document moving past the imaging camera to allow the imaging camera to capture an image of the illuminated financial document. An energizeable second light source of a second electromagnetic frequency is provided for, when energized, illuminating the focus test pattern to allow the imaging camera to capture an image of the illuminated focus test pattern. The first light source is controlled so that the first light source is energized when a financial document in the document transport path is between the imaging camera and the focus test pattern. The second light source is controlled so that the second light source is energized when a gap is between adjacent financial documents in the document transport path. The captured image of the focus test pattern is analyzed to determine if the focus of the imaging camera is acceptable.

10 Claims, 7 Drawing Sheets

IMAGE-BASED CHECK PROCESSING SYSTEM AND A METHOD OF OPERATING AN IMAGE-BASED CHECK PROCESSING SYSTEM TO TEST FOCUS OF AN IMAGING CAMERA

BACKGROUND OF THE INVENTION

The present invention relates to image-based check processing, and is particularly directed to an image-based check processing system and a method of operating an image-based check processing system to test focus of an imaging camera.

A typical image-based check processing system includes a document transport path along which financial document items can be transported from an upstream end to a downstream end. An imaging camera is disposed along one side of the document transport path to capture images of financial document items moving past the imaging camera. The imaging camera has an optical system which is focused so that quality images of the financial document items can be captured.

A known way to focus the optical system of the imaging camera is to make focus adjustments during manufacture of the image-based check processing system. This may be accomplished by capturing an image of a focus test document, analyzing the image of the focus test document, and then making any necessary focus adjustments. As an alternative to making focus adjustments during manufacturing of the image-based check processing system, an image of the focus test document may be captured and analyzed by a field service engineer when the image-based check processing system is installed in the field. Another known way to focus the optical system of the imaging camera is to use focus test patterns which are printed on batch headers and batch trailers. In this case, images of the focus test patterns on the batch headers and the batch trailers are captured and analyzed only at the start and the end of each batch of financial document items.

A disadvantage in the known ways of focusing the optical system of an imaging camera is that the optical system may go out of focus during operation of the image-based check processing system. When this occurs, poor quality images of financial document items will be captured. Poor quality images of financial document items will usually continue to be captured and remain undetected until the optical system of the imaging camera is adjusted back into focus. For example, in the case of the focus test patterns on the batch headers and the batch trailers, the capture of poor quality images of financial document items will usually continue for at least the entire batch of financial document items until the next batch of financial document items is processed. It would be desirable to provide a way of adjusting the focus of the optical system of the imaging camera so as to eliminate, or at least, reduce the capture of poor quality images of financial document items during operation of the image-based check processing system.

SUMMARY OF THE INVENTION

In accordance with one aspect of the present invention, an image-based check processing system comprises means defining a document transport path along which financial documents can be transported from an upstream end to a downstream end. A focus test pattern is on a background surface which is disposed along one side of the document transport path. An imaging camera is disposed along an opposite side of the document transport path and faces the focus test pattern. The imaging camera is provided for (i) capturing an image of a financial document along the document transport path when the financial document is between the imaging camera and the focus test pattern, and (ii) capturing an image of the focus test pattern when no financial document is between the imaging camera and the focus test pattern. An energizeable first light source of a first electromagnetic frequency is provided for, when energized, illuminating a financial document moving past the imaging camera to allow the imaging camera to capture an image of the illuminated financial document. An energizeable second light source of a second electromagnetic frequency is provided for, when energized, illuminating the focus test pattern to allow the imaging camera to capture an image of the illuminated focus test pattern. Means is provided for (i) controlling the first light source so that the first light source is energized when a financial document in the document transport path is between the imaging camera and the focus test pattern, and (ii) controlling the second light source so that the second light source is energized when a gap is between adjacent financial documents in the document transport path.

Preferably, the first light source of the first electromagnetic frequency provides visible light, and the second light source of the second electromagnetic frequency provides invisible light. The invisible light from the second light source may comprise ultraviolet light. The focus test pattern is substantially invisible when the first light source of the first electromagnetic frequency is illuminated. The captured image of the focus test pattern is analyzed to determine if the focus of the imaging camera is acceptable.

In accordance with another aspect of the present invention, a method of operating an image-based check processing system to test focus of an imaging camera in an image-based check processing system having a focus test pattern on a background surface which is disposed on one side of a document transport path, comprises capturing an image of a financial document if the financial document is between the focus test pattern and an imaging camera disposed on an opposite side of the document transport path during operation of the image-based check processing system, and capturing an image of the focus test pattern if no financial document is between the focus test pattern and the imaging camera during operation of the image-based check processing system. The method may further comprise analyzing the captured image of the focus test pattern to determine if the focus of the imaging camera is acceptable.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

The present invention is directed to an image-based check processing system and a method of operating an image-based check processing system to test focus of an imaging camera in the image-based check processing system. The specific construction and use of the image-based check processing system may vary. The image-based bank check processing system may be, for example, a sorting machine or a proof machine wherein financial documents such as bank checks are processed in a data processing operation.

Figure 1:
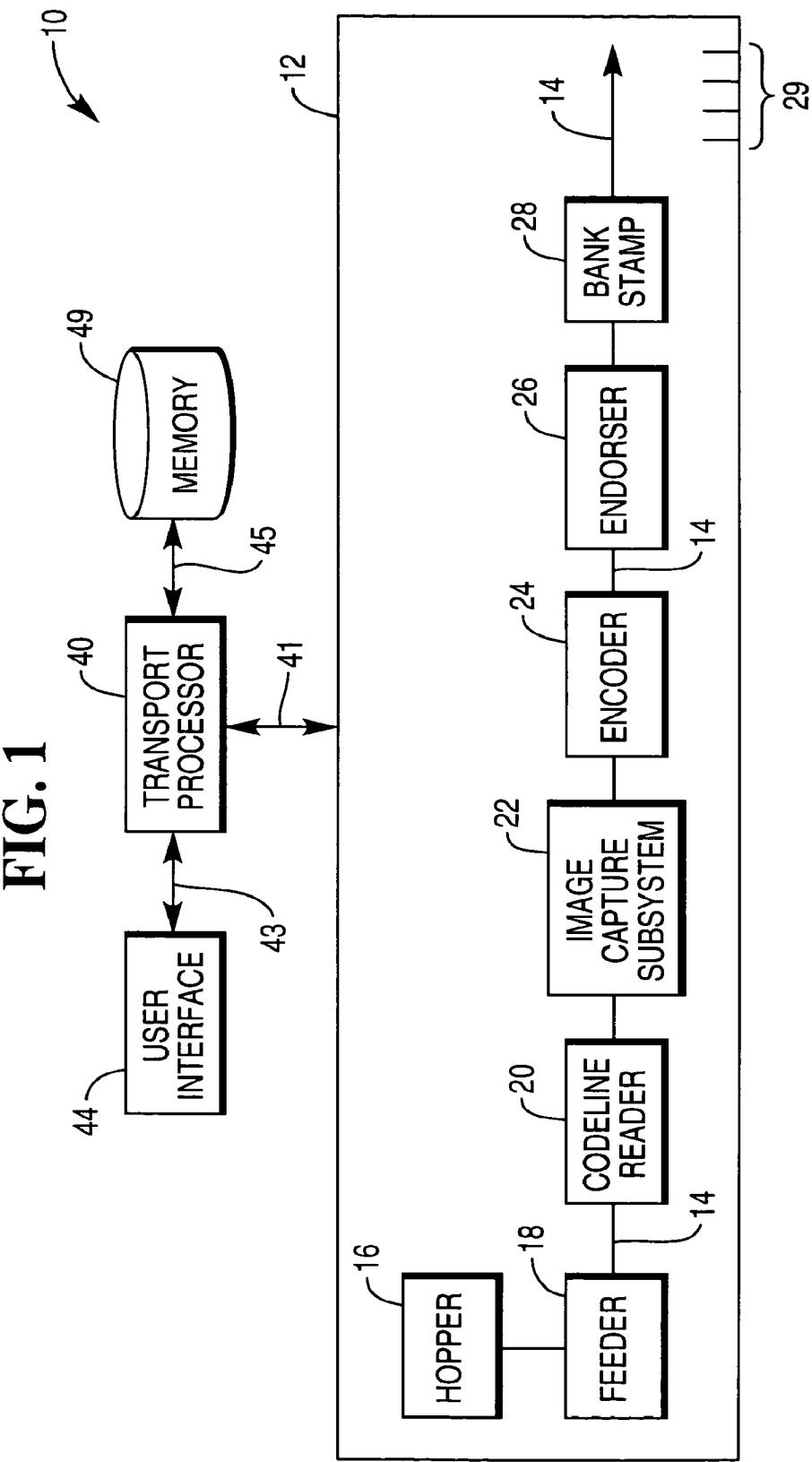
FIG. 1 is a schematic view of an image-based check processing system embodying the present invention.

As shown in FIG. 1, an image-based check processing system 10 includes a check processing transport 12 having a document track which defines a document transport path 14 along which financial documents (i.e., items), such as checks, can be transported from an upstream end to a downstream end. The transport 12 includes a number of different hardware devices lying along the document transport path 14 for performing specific document processing operations on financial documents moving along the document transport path 14. The transport 12 includes a hopper 16 into which a stack of financial documents including checks are placed. A document feeder 18 adjacent the hopper 16 selectively feeds or drives each financial document from the stack of financial documents in the hopper to transport the financial document from the upstream end to the downstream end along the document transport path 14 to sorting bins 29 (i.e., pockets) located at the end of the document transport path.

The check processing system 10 further includes a codeline reader 20 such as a MICR reader located along the document transport path 14. The MICR reader 20 reads a MICR codeline from each check being processed in a known manner. Alternatively, the codeline reader may be an OCR reader instead of a MICR reader depending upon on the particular application. The structure and operation of MICR readers and OCR readers are well known and, therefore, will not be described.

The check processing system 10 further includes an image capture subsystem 22 located along the document transport path 14. The image capture subsystem 22 captures an image of each check moving along the document transport 14 for a number of different purposes well known in the art. The structure and operation of the image capture subsystem 22 will be described in detail later.

An encoder 24 encodes missing fields on each check. An endorser 26 applies an endorsement in a known manner to each check. A bank stamp 28 stamps each check to identify the bank institution processing the check. The structure and operation of encoders, endorsers, and bank stamps are well known and, therefore, will not be described.

Figure 2:
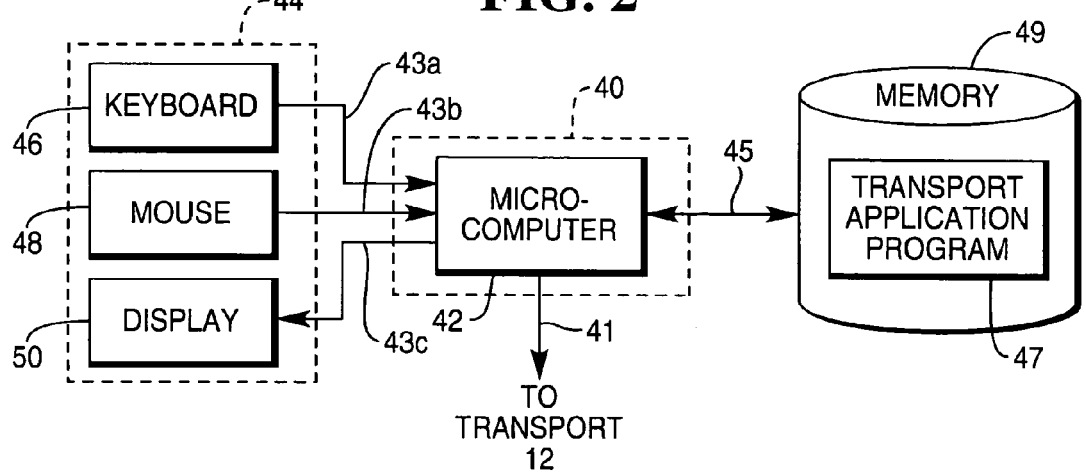
FIG. 2 is a schematic representation of a portion of FIG. 1.

Referring to FIGS. 1 and 2, the check processing system 10 further includes a transport processor 40 and a user interface 44 which communicates via signals on line 43 (FIG. 1) with a microcomputer 42 of the transport processor 40. The user interface 44 includes a keyboard 46, a mouse 48, and a display 50, all of which communicate via signals on lines 43a, 43b, 43c (FIG. 2) with the microcomputer 42. The check processing system 10 includes a memory 49 which communicates via signals on line 45 with the microcomputer 42. The memory 49 stores an executable transport application program 47 which, when executed by the microcomputer 42, controls operation of the transport 12 via signals on line 41. Suitable microcomputers and memories are readily available in the marketplace. Their structure and operation are well known and, therefore, will not be described.

Figure 3:
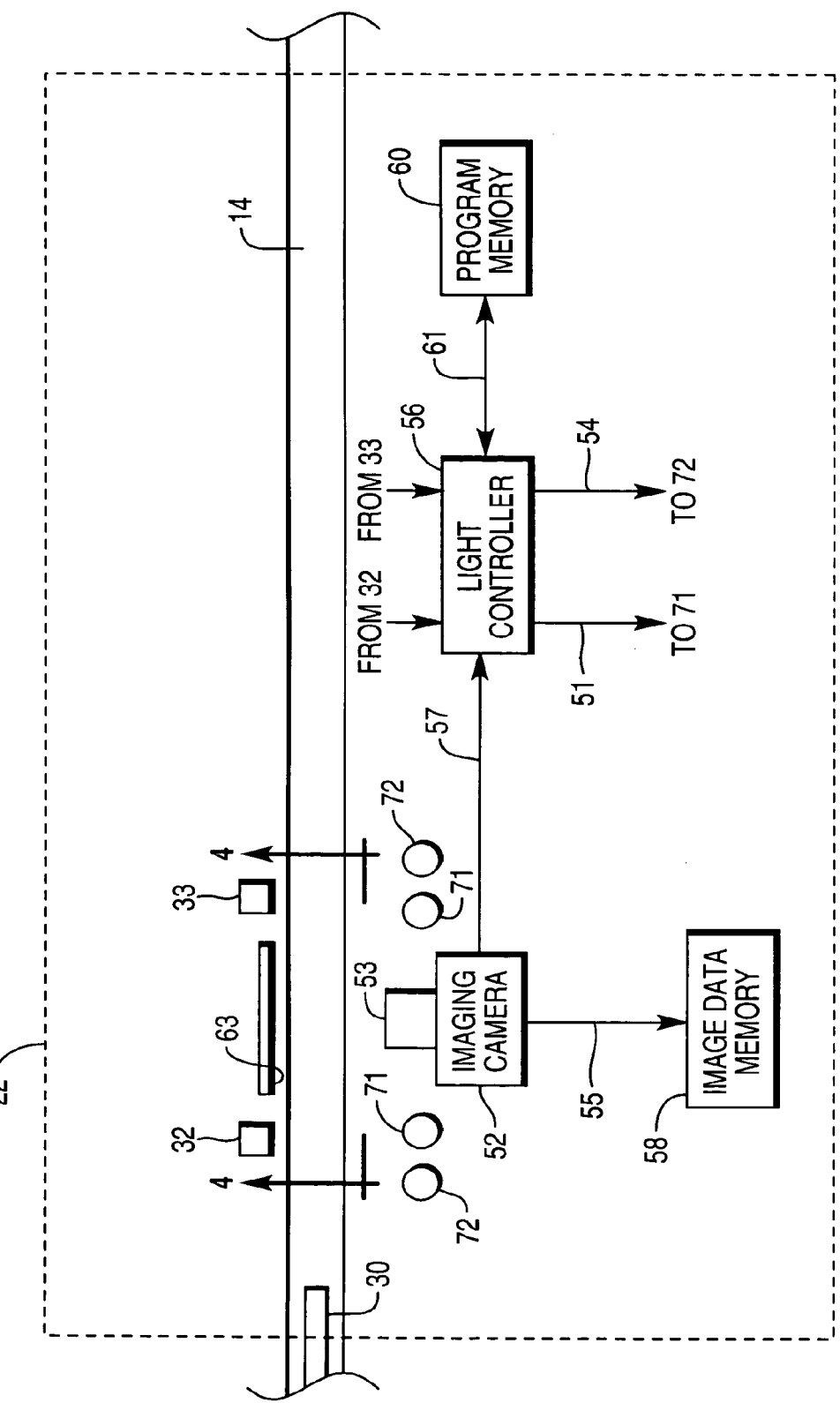
FIG. 3 is a schematic view of an image capture subsystem used in the image-based check processing system of FIG. 1.

As shown in FIG. 3, the image capture subsystem 22 further includes a light controller 56 which communicates via line 61 with a program memory 60. The light controller 56 may include a microcomputer which communicates with the program memory 60. Suitable microcomputers and memories are readily available in the marketplace. Their structure and operation are well known and, therefore, will not be described. Alternatively, the light controller 56 may include dedicated hardware circuitry for the particular application desired. The image capture subsystem 22 includes a first set of lamps 71 located on one side of the document transport path 14. The light controller 56 controls the first set of lamps 71 to provide light which is sufficient to illuminate a check 30 which is being transported from the upstream end of the document transport path 14 towards the downstream end of the document transport path. Light from the first set of lamps 71 is reflected from the check 30 to provide an image of the check. Preferably, light from the lamps 71 is in the visible frequency range of the electromagnetic spectrum, and provides normal illumination of the check 30.

Figure 4:
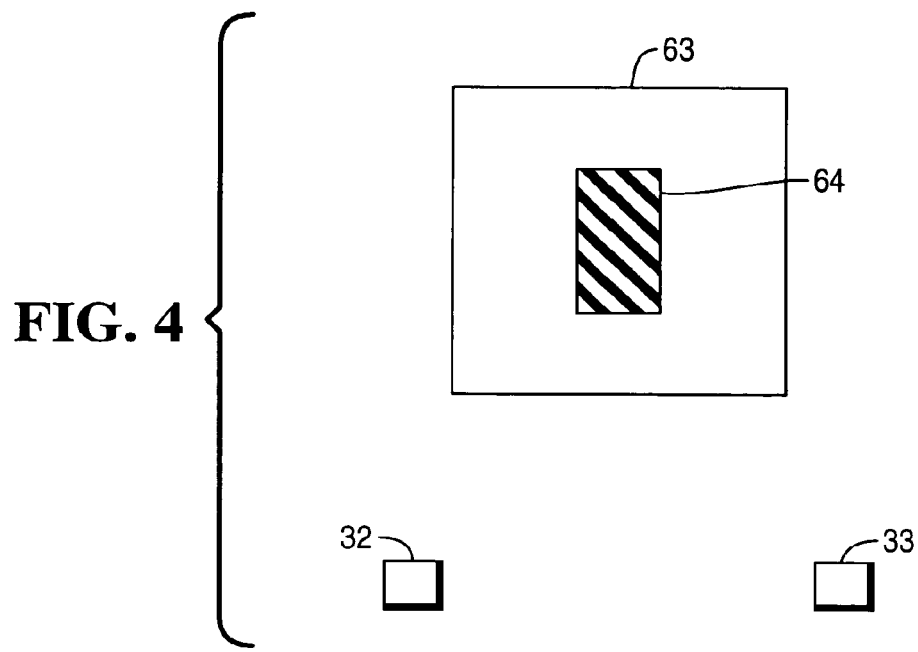
FIG. 4 is a view looking generally in the direction of line 4-4 in FIG. 3 and showing a focus test pattern on a reference background surface of the image capture subsystem of FIG. 3.

The image capture subsystem 22 also includes a reference background surface 63 on which a focus test pattern 64 is disposed, as best shown in FIG. 4. The particular pattern of the focus test pattern 64 shown in FIG. 4 comprises a number of solid, diagonally-extending bars. Preferably, the focus test pattern 64 is printed onto the reference background surface 63 using an ink that is substantially invisible when light is provided from the first set of lamps 71. For example, the ink may comprise an ink which becomes fluorescent when exposed to ultraviolet light.

As shown in FIG. 3, the image capture subsystem 22 further includes an imaging camera 52 which is located along the same side of the document transport path 14 as the first set of lamps 71. The camera 52 includes an optical system 53 having a number of lenses through which the image of the check 30 is magnified to provide a magnified image of the check. The magnified image may be either a reduction or an enlargement of the check 30. The camera 52 may include a charge-coupled device (CCD) or other suitable element having a linear array of sensors which scan the magnified image of the check 30.

Figure 5:
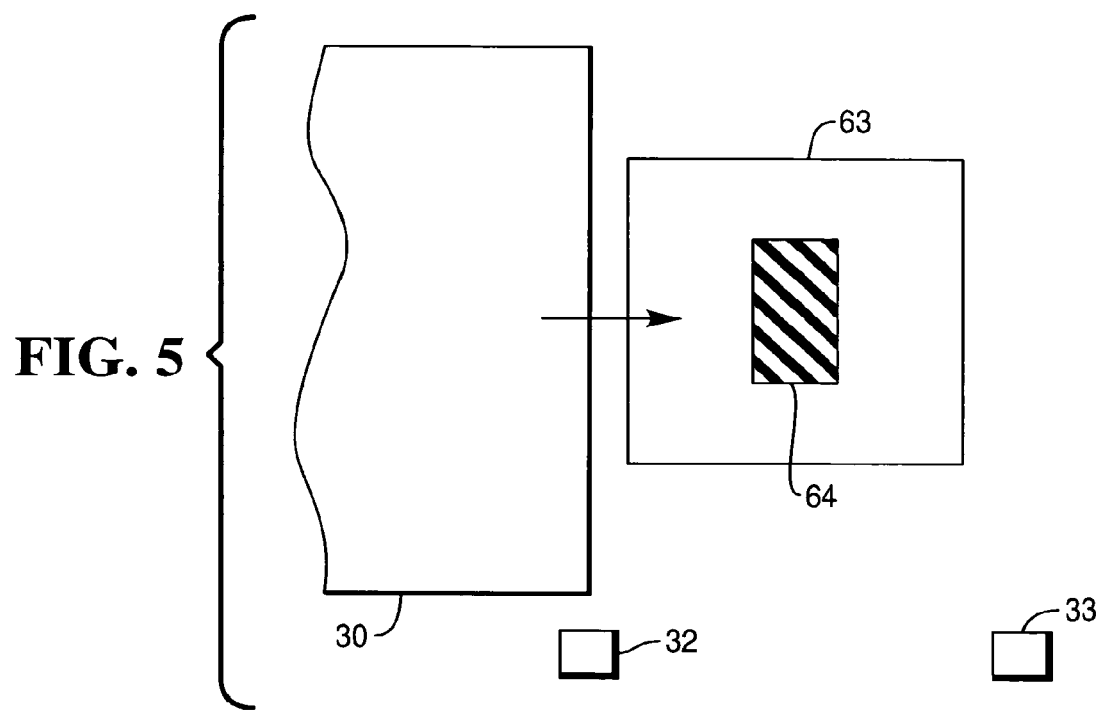
FIG. 5 is a view similar to FIG. 4 and showing a leading check upstream of the image capture subsystem.
Figure 7:
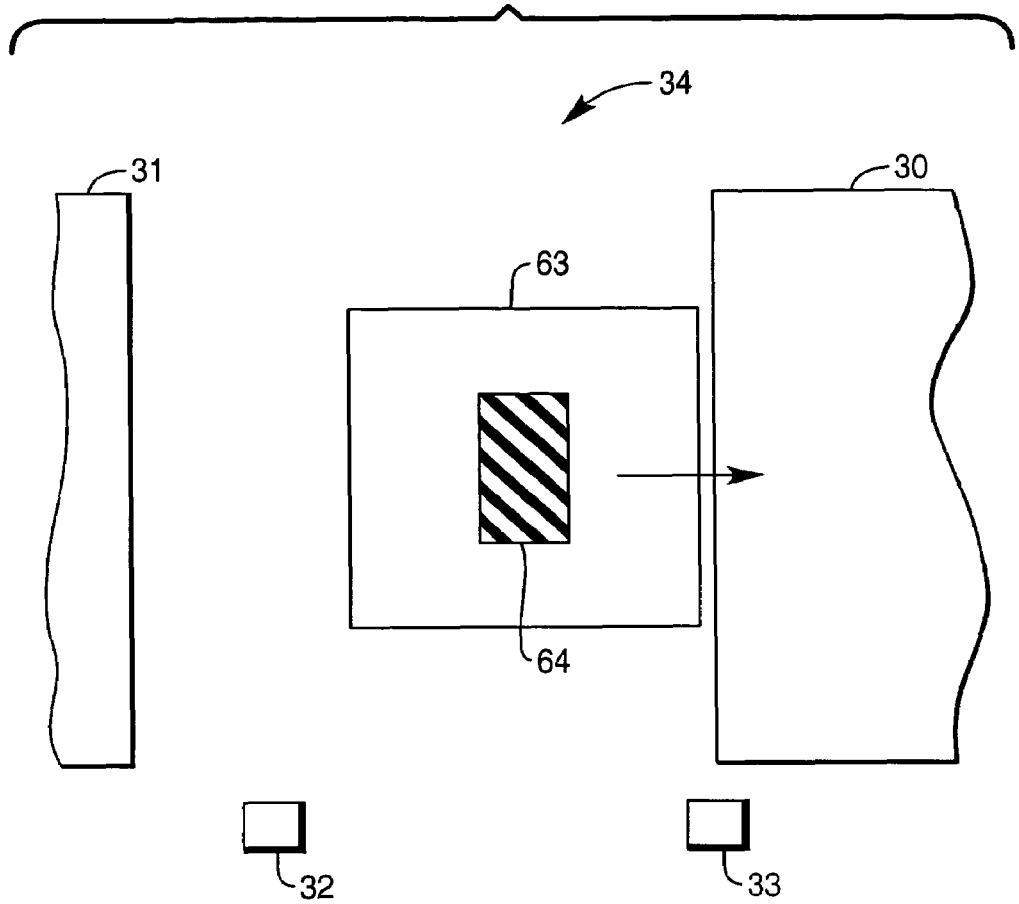
FIG. 7 is a view similar to FIG. 6 and showing the leading check downstream of the image capture subsystem and a trailing check upstream of the image capture subsystem.

A first trigger sensor 32 is located along the document transport path 14 upstream of the camera 52. The first trigger sensor 32 provides a trigger signal when the leading edge of the check 30 moving along the document transport path 14 is detected. A second trigger sensor 33 is located along the document transport path 14 downstream of the camera 52. The second trigger sensor 33 provides a trigger signal when the trailing edge of the check 30 moving along the document transport path 14 is detected. Accordingly, the first trigger sensor 32 provides a trigger signal when the leading edge of the check 30 moving along the document transport path 14 is detected and is about to move in front of the camera 52 (as shown in FIG. 5), and the second trigger sensor 33 provides a trigger signal when the trailing edge of the check moving along the document transport path is detected and has just moved past the camera 52 (as shown in FIG. 7).

The light controller 56 monitors the first trigger sensor 32 for the presence of a trigger signal. When the light controller 56 detects the trigger signal from the first trigger sensor 32, the light controller provides a control signal on line 51 to turn ON the first set of lamps 71 to illuminate the check 30. As the illuminated check 30 moves in front of the camera 52 and continues to move past the camera towards the downstream end of the document transport path 14, the camera captures the image of the check 30. More specifically, as the check 30 moves past the camera 52, the camera may generate successive scan lines of pixels to produce a matrix of pixels associated with the check. Each pixel is usually represented by gray scale image data in which a particular gray level is associated with the pixel. For example, each pixel may have any one of 256 gray levels associated therewith, ranging from completely black (level zero) to completely white (level 255). Alternatively, the camera 52 may be of the type which captures color image data associated with the check 30. The camera 52 provides image data on line 55 which is stored in an image data memory 58 to provide a stored digitized image of the check 30.

Figure 6:
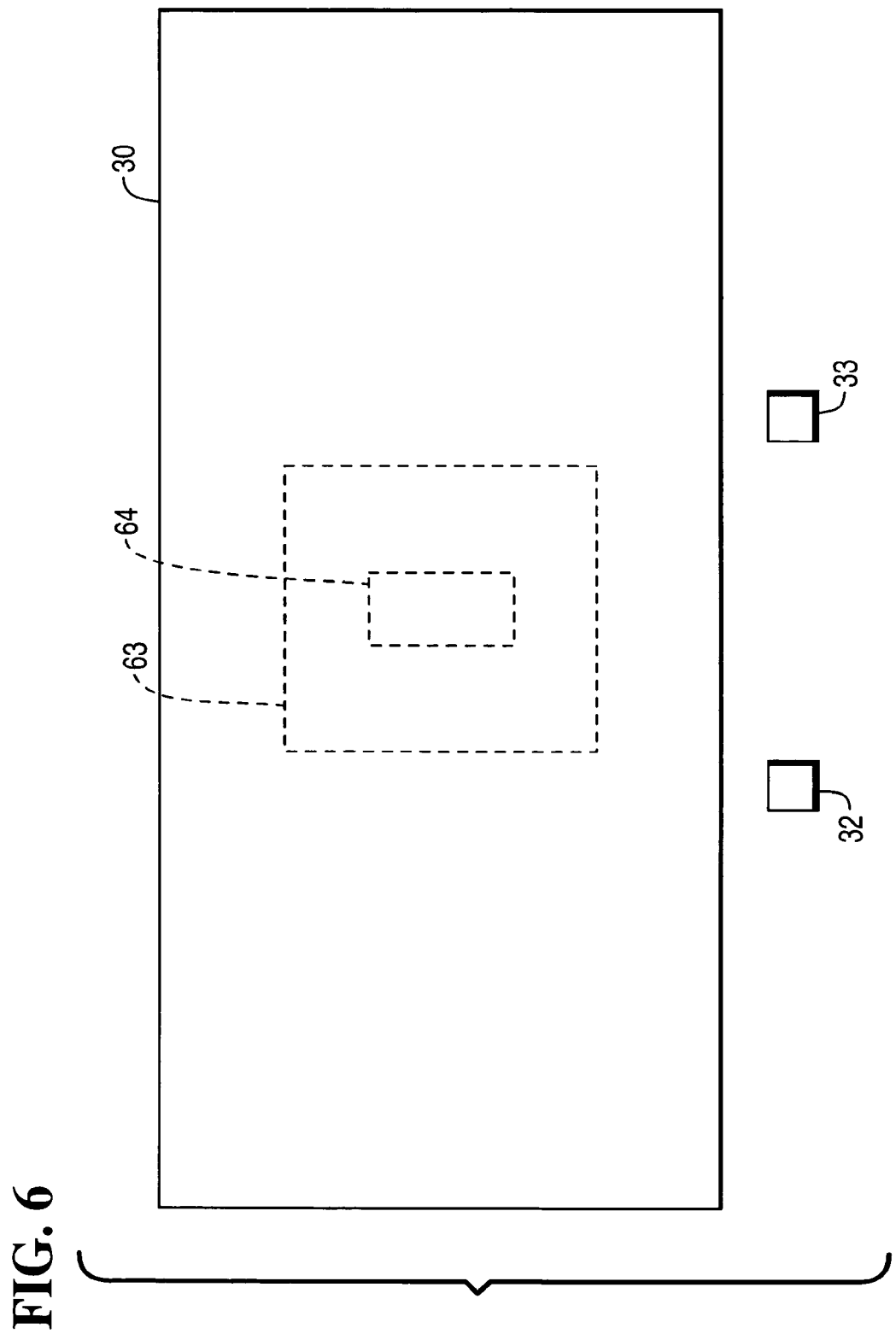
FIG. 6 is a view similar to FIG. 5 and showing the leading check between the focus test pattern and an imaging camera of the image capture subsystem.

The camera 52 continues capturing an image of the check 30 as the check continues moving downstream along the document transport path 14 past the camera 52, such as shown in FIG. 6. The camera 52 continues capturing the image of the check 30 until the trailing edge of the check has moved past the camera, such as shown in FIG. 7. As shown in FIG. 7, the check 30 is downstream from the optical system 53 of the imaging camera 52, and an adjacent check 31 in the document transport path 14 is upstream from the optical system of the camera. The check 30 is referred to herein as a leading check along the document transport path 14, and the check 31 is referred to herein as a trailing check along the document transport path. There is a gap 34 between the trailing edge of the leading check 30 and the leading edge of the trailing check 31.

Referring back to FIG. 3, the image capture subsystem 22 further includes a second set of lamps 72 which is located along the same side of the document transport path 14 the first set of lamps 71 is located. Preferably, the second set of lamps 72 provides light in the invisible frequency range of the electromagnetic spectrum, and provides normal illumination of the focus test pattern 64 on the reference background surface 63.

The light controller 56 monitors the second trigger sensor 33 for the presence of a trigger signal. When the light controller 56 detects the trigger signal from the second trigger sensor 33, the light controller provides a control signal on line 54 to turn OFF the first set of lamps 71 and to turn ON the second set of lamps 72 to illuminate the focus test pattern 64 on the reference background surface 63. Thus, after the trailing edge of the leading check 30 has moved past the camera 52, as shown in FIG. 7, the light controller 56 controls the second set of lamps 72 to provide light which passes through the gap 34 to illuminate the focus test pattern 64 on the background surface 63.

The imaging camera 52 captures an image of the focus test pattern 64 which is illuminated by the second set of lamps 72. The light controller 56 receives on line 57 (FIG. 3) from the camera 52 image data which is representative of the captured image of the focus test pattern 64. The light controller 56 processes this image data to determine if the quality of the image data meets predetermined criteria. If the quality of the image data meets the predetermined criteria, a conclusion is drawn that the optical system 53 of the camera 52 is focused and does not need to be adjusted. However, if the quality of the image data does not meet the predetermined criteria, a conclusion is drawn that the optical system 53 of the camera 52 is out of focus and needs to be adjusted.

When a conclusion is drawn that the optical system 53 of the camera 52 is out of focus and needs to be adjusted, the light controller 56 may halt operation of the image-based check processing 10 so that adjustments to the optical system 53 of the camera 52 can be made. Alternatively, the light controller 56 may provide a signal to alert a human operator that the optical system 53 of the camera 52 needs to be adjusted. The human operator can then take the next steps to make the necessary adjustments.

Figure 8:
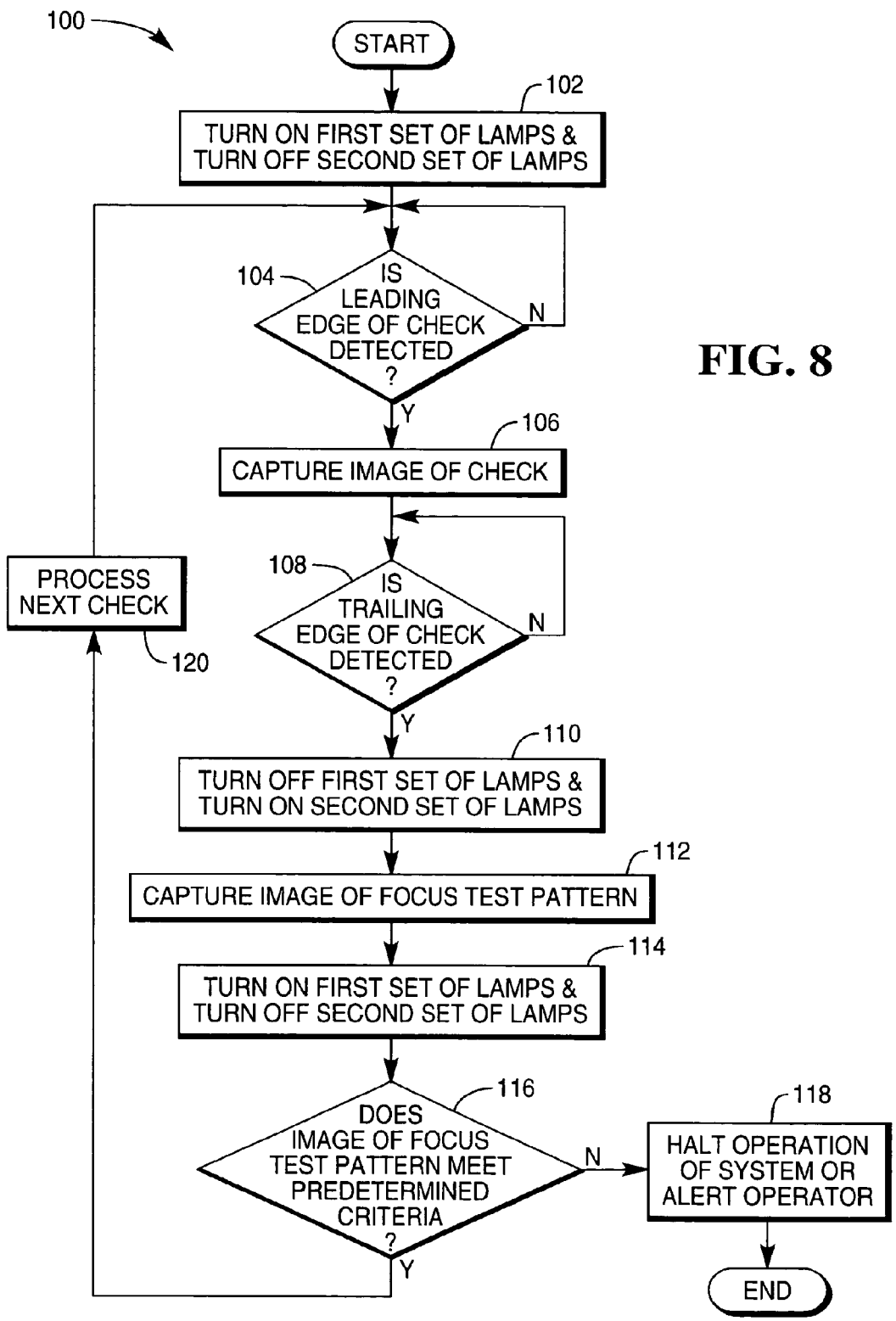
FIG. 8 is a flowchart depicting a process embodying the present invention.

Referring to FIG. 8, a flowchart 100 depicts the process in which the image of the focus test pattern 64 is captured and analyzed to determine if the focus of the optical system 53 of the camera 52 is out of adjustment. Initially, the first set of lamps 71 is turned ON and the second set of lamps 72 is turned OFF, as shown in step 102. A determination is made in step 104 as to whether the leading edge of the leading check 30 is detected by the first trigger sensor 32. If the determination in step 104 is negative, the first trigger sensor 32 continues to monitor for the presence of the leading edge of the leading check 30.

When the leading edge of the leading check 30 is detected, the process proceeds to step 106 in which the camera 52 capture an image of the check 30. A determination is made in step 108 as to whether the trailing edge of the leading check 30 is detected. If the determination is step 108 is negative, the camera 52 continues to capture the image of the leading check 30. When the trailing edge of the leading check 30 is detected, the process proceeds to step 110 in which the first set of lamps 71 is turned OFF and the second set of lamps 72 is turned ON. The process proceeds to step 112 in which the camera 52 captures an image of the focus test pattern 64. After the image of the focus test pattern 64 is captured, the first set of lamps 71 is turned back ON and the second set of lamps 72 is turned back OFF, as shown in step 114.

Then in step 116, a determination is made as to whether the captured image of the focus test pattern 64 meets predetermined criteria. This predetermined criteria may be stored in any type of storage device which may include the program memory 60 or memory in the light controller 56. If the determination in step 116 is negative, a notice is provided to indicate that the captured image of the focus test pattern 64 did not meet the predetermined criteria. This notice may be in the form of halting operation of the image-based check processing system 10 or alerting a human operator, for examples, as shown in step 118. However, if the determination is step 116 is affirmative (i.e., the image of the focus test pattern 64 does meet the predetermined criteria), the process proceeds to step 120 and back to step 104 in which the next check is processed in the same manner as just described hereinabove.

It should be apparent that the focus test pattern 64 is illuminated by light from the second set of lamps 72 and captured as an image by the camera 52 when there is the gap 34, as shown in FIG. 7, between the leading check 30 and the trailing check 31 along the document transport path 14. The image of the focus test pattern 64 is captured to allow a quality assessment of the focus of the optical system 53 of the camera 52 to be made.

It should be noted that the particular pattern (i.e., the solid diagonally-extending bars as shown in FIG. 4) of the focus test pattern 64 is exemplary only, and that other patterns may be used. It should also be noted that the use of the particular pattern of the focus test pattern 64 allows for a horizontal (as viewed looking at FIG. 4) alignment of the camera 52 to be made.

Although the above description describes the first set of lamps 71 and the second set of lamps 72 being located on the one side of the document transport path 14, it is conceivable that these two sets of lights 71, 72 may be located on the opposite side of the document transport path. It is also conceivable that the one set of lights be disposed on one side of the document transport path 14, and the other set of lights be disposed on the other side of the document transport path.

Also, although the above description describes using a pair of trigger sensors (i.e., the first trigger sensor 32 and the second trigger sensor 33) to detect leading and trailing edges of checks, it is contemplated that other types of devices including other types of sensors be used to provide signal so that the light controller 56 knows when to turn each of the first and second sets of lights 71, 72 on and off.

Also, although the above description describes the image capture subsystem 22 as being located along the document transport path 14 between the MICR reader 20 and the encoder 24, as shown in FIG. 1, it is contemplated that the image capture subsystem 22 may be located anywhere along the document transport path. For example, the image capture subsystem 22 could be located along the document transport path 14 after the bank stamp 28. It is also conceivable that more than one image capture subsystem may be used. Also, it is conceivable that the image capture subsystem 22 may comprise another imaging camera which captures an image of the back side of the check 30 as well as the imaging camera 52 described hereinabove which captures an image of the front side of the check.

Further, although the above description describes capturing an image of a focus test pattern between each pair of adjacent checks moving along the document transport path 14, it is contemplated that an image of a focus test pattern be captured less often, such as between a pair of adjacent checks only after a predetermined number images of checks have been captured during normal operation of the image-based check processing system 10.

A number of advantages result by capturing an image of a focus test pattern, such as the focus test pattern 64 shown in FIG. 4, during operation of the image-based check processing system 10 in accordance with the present invention as just described hereinabove. One advantage is that the capturing of poor quality images is detected relatively early. This reduces the number of poor quality images captured.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. An image-based check processing system for processing financial documents, the system comprising:
    a document transport path along which financial documents can be transported from an upstream end to a downstream end;
    a focus test pattern on a background surface which is disposed along one side of the document transport path;
    an imaging camera disposed along an opposite side of the document transport path and facing the focus test pattern and for (i) capturing an image of a financial document along the document transport path when the financial document is between the imaging camera and the focus test pattern, and (ii) capturing an image of the focus test pattern when no financial document is between the imaging camera and the focus test pattern;
    an energizeable first light source of a first electromagnetic frequency and for, when energized, illuminating a financial document moving past the imaging camera to allow the imaging camera to capture an image of the illuminated financial document;
    an energizeable second light source of a second electromagnetic frequency which is different from the first electromagnetic frequency and for, when energized, illuminating the focus test pattern to allow the imaging camera to capture an image of the illuminated focus test pattern; and
    a controller for (i) controlling the first light source to energize the first light source when a financial document in the document transport path is between the imaging camera and the focus test pattern so that the imaging camera can capture an image of the financial document while the financial document is illuminated with light of the first electromagnetic frequency from the first light source, and (ii) controlling the second light source to energize the second light source when a gap is between adjacent financial documents in the document transport path so that the imaging camera can capture an image of the focus test pattern while the focus test pattern is illuminated with light of the second electromagnetic frequency from the second light source.

2. An image-based check processing system according to claim 1, wherein (i) light from the first light source of the first electromagnetic frequency comprises visible light, and (ii) light from the second light source of the second electromagnetic frequency comprises invisible light.

3. An image-based check processing system according to claim 2, wherein the invisible light from the second light source of the second electromagnetic frequency comprises ultraviolet light.

4. An image-based check processing system according to claim 1, wherein the focus test pattern is substantially invisible when illuminated with light from the first light source of the first electromagnetic frequency.

5. An image-based check processing system according to claim 1, further comprising means for analyzing the captured image of the focus test pattern to determine if the focus of the imaging camera is acceptable.

6. A method of operating an image-based check processing system for processing financial documents, the method comprising:
    capturing an image of a financial document along a document transport path when the financial document is between an imaging camera which is disposed on one side of the document transport path and a focus test pattern which is on a background surface disposed along an opposite side of the document transport path;
    capturing an image of the focus test pattern when no financial document is between the imaging camera and the focus test pattern;
    at a first time, energizing a first light source of a first electromagnetic frequency to illuminate a financial document moving past the imaging camera with light of the first electromagnetic frequency from the first light source;
    at a second time which is after the first time, energizing a second light source of a second electromagnetic frequency which is different from the first electromagnetic frequency to illuminate the focus test pattern with light of the second electromagnetic frequency from the second light source;
    controlling the first light source to energize the first light source when a financial document in the document transport path is between the imaging camera and the focus test pattern to allow the imaging camera to capture an image of the financial document while the financial document is illuminated with light of the first electromagnetic frequency from the first light source; and controlling the second light source to energize the second light source when a gap is between adjacent financial documents in the document transport path to allow the imaging camera to capture an image of the focus test pattern while the focus test pattern is illuminated with light of the second electromagnetic frequency from the second light source.

7. A method according to claim 6, further comprising:
analyzing the captured image of the focus test pattern to determine if the focus of the imaging camera is acceptable.

8. A method according to claim 6, wherein (i) light from the first light source of the first electromagnetic frequency comprises visible light, and (ii) light from the second light source of the second electromagnetic frequency comprises invisible light.

9. A method according to claim 8, wherein the invisible light from the second light source of the second electromagnetic frequency comprises ultraviolet light.

10. A method according to claim 6, wherein the focus test pattern is substantially invisible when illuminated with light from the first light source of the first electromagnetic frequency.

* * * * *